Nov. 28, 1961 C. H. GARMAGER 3,010,555
CLUTCH
Filed March 13, 1958 2 Sheets-Sheet 1
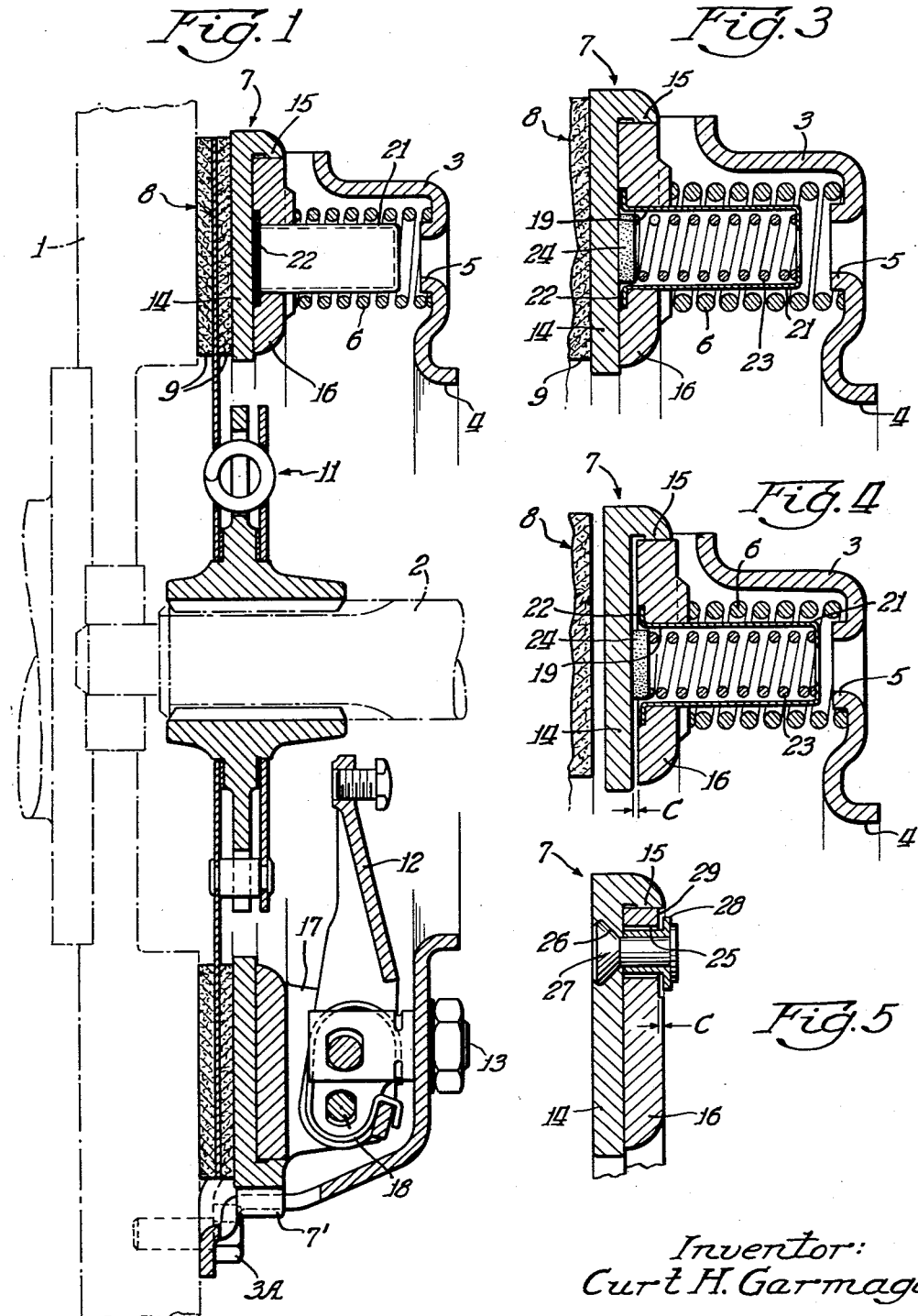
Inventor:
Curt H. Garmager

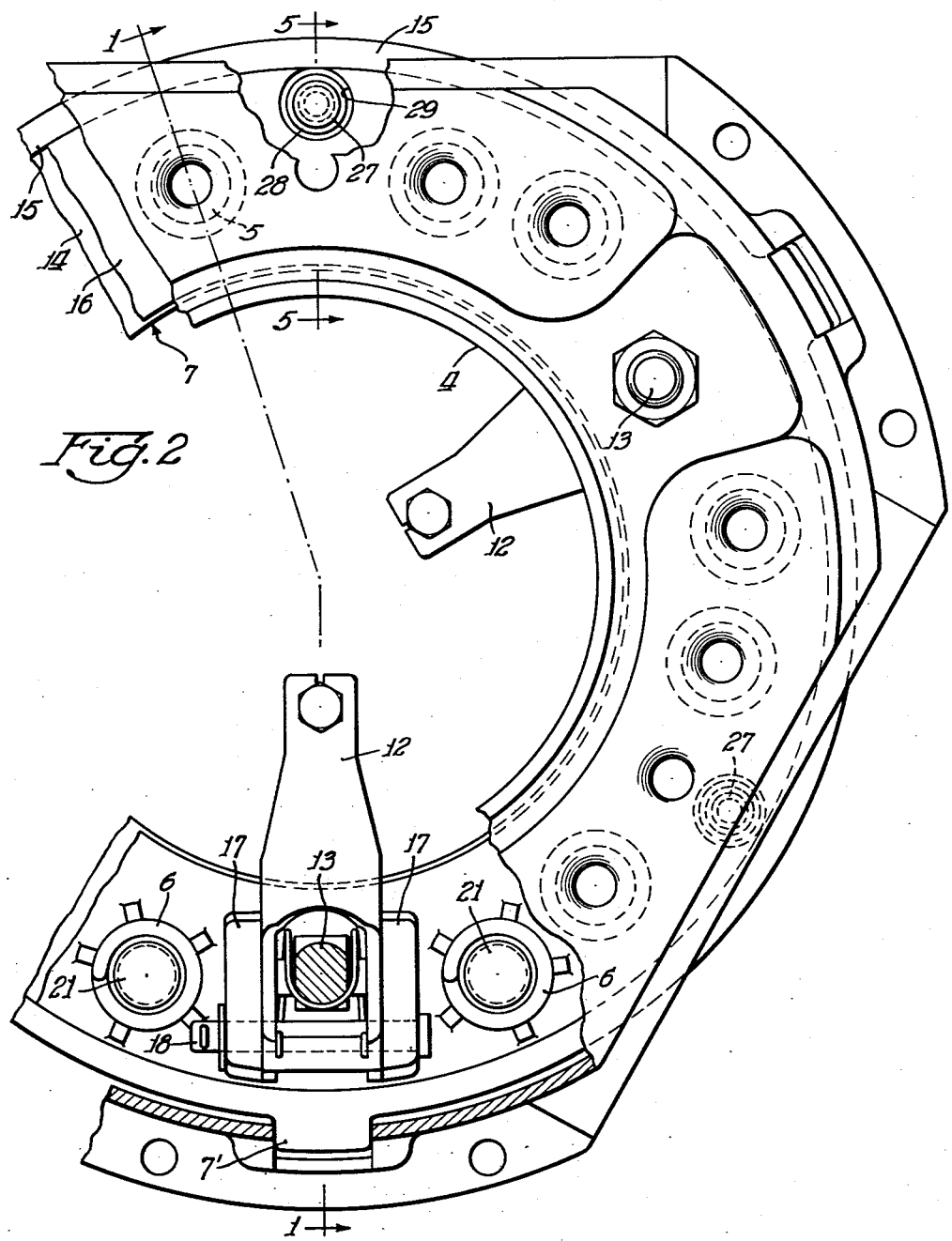

United States Patent Office 3,010,555
Patented Nov. 28, 1961

3,010,555
CLUTCH
Curt H. Garmager, Rockford, Ill., assignor to Borg-Warner Corporation, Chicago, Ill., a corporation of Illinois
Filed Mar. 13, 1958, Ser. No. 721,181
4 Claims. (Cl. 192—109)

This invention relates to clutch devices, and more particularly to clutch devices having cushioning means therein suitable for use in tractors or other devices or vehicles in which a cushioned clutch engagement is desirable.

When employing a driven plate with a relatively hard and inflexible friction material, such as Cerametallic material, it is desirable to provide in such a clutch cushioning means to prevent abrupt, "grabbing" clutch action. Often times, however, it is difficult and expensive to provide a satisfactory cushioning means in the driven plate itself which will be both economical, compact and reliable over a substantial period of time.

It is therefore one object of the present invention to provide a new and improved clutch structure having cushioning means which are relatively inexpensive, compact and reliable.

Another object is the provision of a device in accordance with the preceding object in which the cushioning means are provided in the pressure plate.

Another object is the provision of a device in accordance with the preceding objects in which the pressure plate comprises a two piece assembly, the parts thereof being relatively movable longitudinally of each other.

Another object of the present invention is the provision of a device in accordance with the preceding objects in which means are provided for separating the two pieces of the pressure plate assembly, and in which further means are provided for limiting the relative movement therebetween.

Other objects and features of the invention will be readily apparent to those skilled in the art from the specification and appended drawings illustrating certain preferred embodiments in which:

FIGURE 1 is a sectional view along the plane of line 1—1 of FIGURE 2;

FIGURE 2 is a partial plan view of a device constructed in accordance with the present invention in which certain parts are broken away to facilitate the understanding thereof;

FIGURE 3 is an enlarged view of the upper portion illustrated in FIGURE 1;

FIGURE 4 is a view similar to FIGURE 3 with the parts illustrated in the clutch disengaged condition;

FIGURE 5 is an enlarged sectional view along the plane of line 5—5 of FIGURE 5.

In FIGURES 1 and 2 particularly, there is shown a clutch incorporating the present invention, the clutch being illustrated in its normal, "engaged" condition in which it is adapted to couple together a driving plate or flywheel 1 and a shaft 2. This clutch comprises an outer cover member 3 which is generally annular in configuration, and which is provided a large central opening 4 through which the shaft 2 may extend. The cover member 3, adapted for attachment to the drive plate 1 by suitable bolts 3A, integrally forms a plurality of flanges 5 which extend axially forwardly (to the left in FIGURE 1) and which are generally circular in configuration. These flanges 5 serve, as best illustrated in FIGURE 3, as guides for respective clutch pressure springs 6, one end of each spring 6 being associated with one of the flanges 5 while the other end of each spring 6 engages a pressure plate assembly, indicated in general by the numeral 7, and biasing it away from the cover member 3. As a result, the pressure plate assembly 7 is continually biased by the spring 6 toward the position illustrated in FIGURES 1 and 3 in which the pressure plate assembly 7 tends to maintain the clutch in its "engaged" position. Pressure plate assembly 7 has a plurality of lugs 7' extending through suitable openings in the cover member 3 to assure common rotation of these elements.

The assembly 7 is adapted to force a driven plate 8 into engagement with the driving plate 1. The driven plate 8 may have friction facings 9 secured thereto which may be of Cerametallic or similar material. The plate 8 is conventionally connected to the shaft 2 by vibration dampener means 11 of a common type.

In order to withdraw the pressure plate assembly 7 to a position spaced from the driven plate 8, or in other words to place the clutch in its "disengaged" position, there are provided a plurality of clutch release levers 12, the inner ends of which project into the opening 4 in the cover member 3. These release levers are symmetrically disposed within the clutch, and each has an intermediate portion pivotally mounted upon a bolt 13 which extends through a suitable aperture in the cover member 3. The outer end portions of the release levers 12 are pivotally mounted to the pressure plate assembly 7 so that, as will be more fully described hereinafter, when the inner ends of the release levers 12 are rotated toward the driven plate 8, the pressure plate assembly 7 is moved away from the driven plate 8 against the bias of the springs 6.

As best illustrated in FIGURES 1 and 3, the pressure plate assembly 7 comprises an annular main section 14 having a forward face adapted to engage the driven member 8 and having an inwardly facing annular flange 15. The inwardly facing surface of the flange 15 is disposed in engagement with the annular outer periphery of a secondary section 16 of the pressure plate assembly 7. Section 16 is annular in configuration and is engaged by the inner end of the springs 6. Section 16 is also provided with a pair of spaced lugs 17 corresponding to each of the release levers 12, each pair of lugs 17 receiving a pin 18 which also extends through a suitable aperture in the radially outer portion of the corresponding release lever 12 and which transmits movement of the release lever to the section 16 of the pressure plate assembly 7.

The section 16 is provided with a plurality of circular apertures 19, corresponding in number and positioning with the springs 6. Through each of the apertures 19 extends a generally cup-shaped retainer 21, each of which has as its open end a flanged section 22 disposed in a suitable notch in the forwardly facing side of section 16. Within each retainer 21 is a spring 23 of substantially less biasing force than the spring 6. One end of each spring 23 engages the relatively closed end of the retainer 21, while the opposite end engages a heat resistant washer 24 mounted upon main section 14 of the pressure plate assembly 7. It will be apparent that the spring 23 tends to separate secondary section 16 of the pressure plate assembly 7 from the main section 14 thereof, and this action is opposed by the springs 6. As best illustrated in FIGURE 5, the outer periphery of the secondary section 16 is provided with an additional series of circumferentially and symmetrically spaced apertures 25. In addition, the outer periphery of main section 14 is provided with a plurality of apertures 26, aligned with the openings 25. Through each of the openings 25—26 extends a rivet 27, and surrounding each rivet is an annular, flanged bushing 28, T-shaped in cross section as illustrated in FIGURE 5. The forward face of each bushing 28 engages the main section 14, while the flanged, rearward portion of each bushing engages the underside of the rearmost rivet head. As indicated in FIGURE 5, the rear face of secondary section 16 adjacent the openings 25 is recessed, as at 29, so that when the secondary section 16 is in engagement with the main section 14 there is clearance between the flange on bushing 28 and the secondary section 16, this clearance being designated on FIGURE 5 as C.

As previously explained, the springs 6 bias section 16 into engagement with section 14, so as to force pressure plate assembly 7 into tight engagement with driven plate 8, the driven plate being clamped between pressure plate 7 and driving plate 1 so that torque is transmitted to the shaft 2. When it is desired to release the clutch, the release levers 12 are rotated so that the radially inner portions thereof move forwardly toward the driven plate 8. The pins 18 are thereby moved away from the driven plate 8 and transmit this movement to the lugs 17 on the secondary section 16. As this movement commences, it should be noted that the main section 14 remains in engagement with the driven plate 8, and that this condition obtains until the secondary section 16 is moved through the distance indicated by clearance C; subsequently, further rearward movement of secondary section 16 is transmitted to the main section 14 through the bushing 28 and rivet 27 until section 14 is spaced from driven plate 8, as illustrated in FIGURE 4. As long as the clutch release levers 12 are maintained in the rotated position aforedescribed, the condition illustrated in FIGURE 4 will obtain, the sections 14 and 16 being maintained separated by the distance C by virtue of the springs 23. As these springs 23 bias retainers 21 rearwardly, this movement is transmitted by the flanges 22 on the retainer 21 to the secondary section 16.

When the clutch release levers are released, the springs 6 initially act to move main section 14 into engagement with the pressure plate 8, and thereafter move secondary section 16 into engagement with main section 14, as illustrated in FIGURE 3.

It will be apparent to those skilled in the art that with the invention described above the engagement and disengagement of the clutch is effected in a gradual or cushioned fashion. This is a particularly desirable arrangement where the driven plate has relatively inflexible friction facings such as, for example, buttons of Cerametallic material of the type presently produced by the Bendix Company. It will furthermore be seen that this cushioning is obtained by relatively simple and inexpensive means which are not only reliable, but, in addition, are adaptable to mass production fabrication.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

I claim:
1. In a friction clutch, the combination with a flywheel constituting the driving element and a driven plate constituting the driven element, a cover member connected to the flywheel, a pressure plate assembly acting between the cover member and the driven plate to engage and disengage said clutch elements, said assembly comprising a pair of relatively movable sections, one of said sections having a face adapted to frictionally engage the driven plate and the other of said sections being disposed adjacent said one section on the side thereof opposite the driven plate and engageable with said one section, first resilient means biasing said sections apart, a lost motion connection between said sections to limit the effect of said first biasing means, second resilient means engaging said other section to be biased toward engagement with said one section for providing a primary force to engage the assembly with the driven plate, and release means engageable with said other section and adapted to overcome the effect of said second resilient means.

2. The combination as in claim 1 in which each said resilient means comprise a plurality of coiled compression springs, each spring of the first resilient means being concentrically disposed within a spring of the second resilient means.

3. A clutch having a driven plate and first means defining a pressure plate assembly, said means including a pressure plate movable into and out of clutch engaged positions, first means comprising a plurality of relatively movable sections in axial alignment, second means defining lost motion connection between said sections, third means effective to bias said sections apart including resilient members, fourth means defining a plurality of circumferentially spaced openings in one of said sections, an elongated cup-shaped retainer received in each of said openings, an annular flange formed integrally with said retainer adjacent the open end thereof, each of said resilient members received in one of said retainers and functioning between said retainer and the other one of said sections to effect said bias, resilient means urging said first one of said sections in the clutch engaging direction, and lever means effecting compression of said last-named resilient means to release said clutch.

4. In a friction clutch, the combination with a flywheel constituting the driving element and a driven plate constituting the driven element, a cover member drivingly connected to the flywheel, a pressure plate assembly acting between the cover member and the driven plate to provide for engagement and disengagement of said clutch elements, said assembly comprising a pair of relatively movable annular sections, one of said sections having a face adapted to frictionally engage the driven plate and having an annular flange enabling said other section of telescopically ride therein, the other section being disposed in axial alignment with said one section and adjacent the side thereof opposite the driven plate and adapted to move axially into engagement with said one section, said other section having a plurality of circumferentially spaced openings, cup-shaped retainers each having one end received in one of said openings and having a limited stop to prevent the retainers from sliding outwardly of the openings, a first coil compression spring received within each retainer to act between the retainer and said one section to normally bias said sections apart, means defining a lost motion connection between said sections to limit the effect of said last-named springs, a second coil compression spring surrounding each retainer and acting between said other section and the cover member to urge the assembly into the clutch engaged position, and release means adapted to overcome the effect of said second springs, said second spring unloading upon release of the release means to move the spaced sections whereby the one section engages the driven plate at which time the first springs load up in opposition to the unloading of the second springs.

References Cited in the file of this patent
UNITED STATES PATENTS

| | | |
|---|---|---|
| 1,915,732 | Goldschmidt | June 27, 1933 |
| 2,103,433 | Newton | Dec. 28, 1937 |
| 2,287,631 | Miller | June 23, 1942 |
| 2,353,793 | Stanley | July 18, 1944 |
| 2,366,643 | Nutt | Jan. 2, 1945 |
| 2,721,639 | Miller | Oct. 25, 1955 |